Aug. 4, 1925.
L. D. MOWREY
1,548,805
BARREL VALVE
Filed Oct. 24, 1923
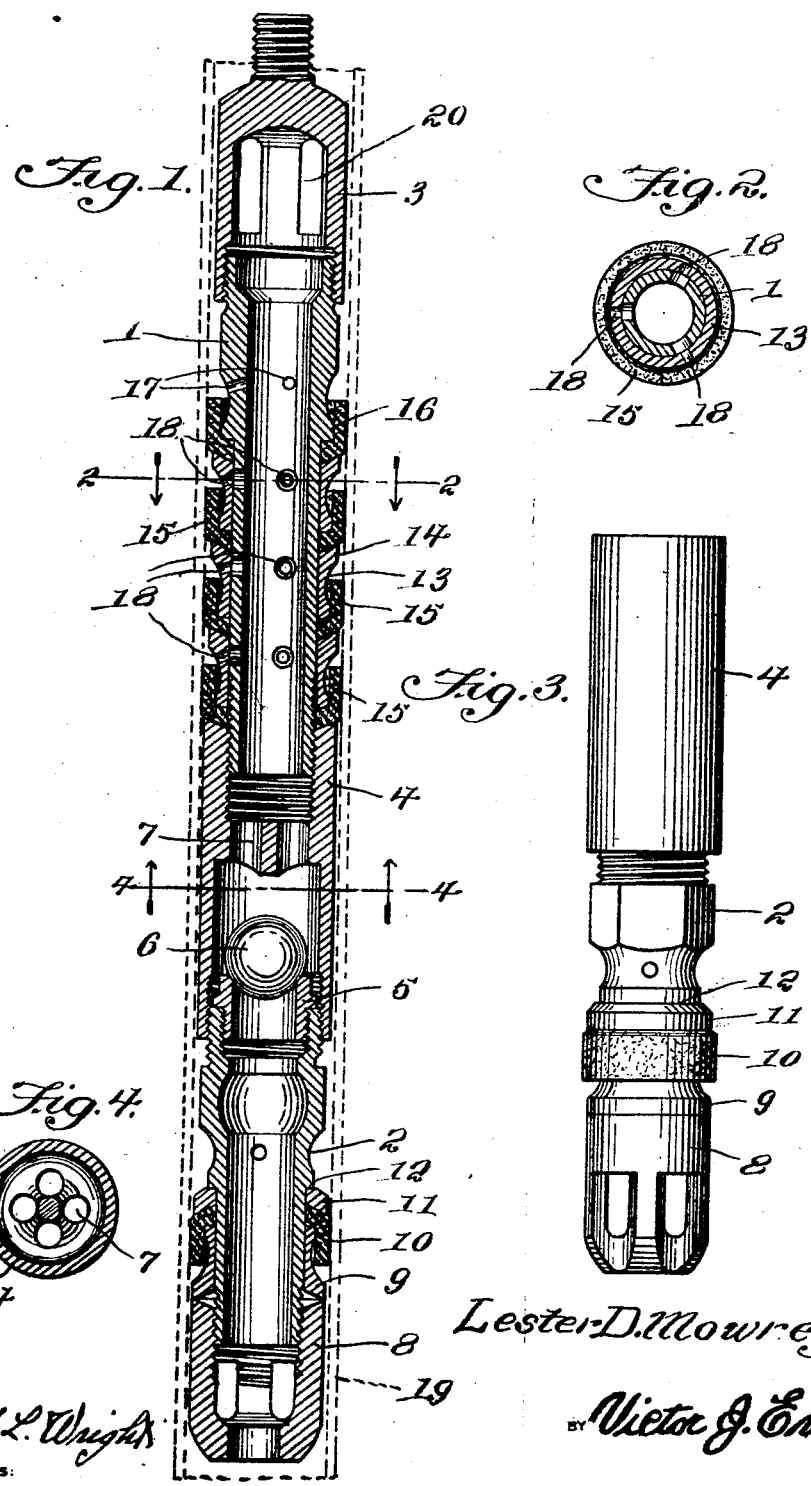
Lester D. Mowrey
INVENTOR
BY Victor J. Evans
ATTORNEY
WITNESS:

Patented Aug. 4, 1925.

1,548,805

UNITED STATES PATENT OFFICE.

LESTER DANIEL MOWREY, OF BURKBURNETT, TEXAS.

BARREL VALVE.

Application filed October 24, 1923. Serial No. 670,553.

*To all whom it may concern:*

Be it known that I, LESTER DANIEL MOWREY, a citizen of the United States, residing at Burkburnett, in the county of Wichita and State of Texas, have invented new and useful Improvements in Barrel Valves, of which the following is a specification.

The object of this invention is to improve the traveling valve used in the common barrel for pumping oil and water wells, by providing the same with a ball valve below the packing cups to more effectively hold the fluid in the valve body, and likewise by providing the said body with apertures that communicate with the cups to lubricate the same and hold the cups snug against the working barrel.

The improvement is illustrated in the drawing which accompanies and which forms part of this application.

In the drawings:—

Figure 1 is an approximately central vertical section view of the improvement.

Figure 2 is a transverse sectional view on the line 2—2 of Figure 1.

Figure 3 is an elevation of the lower member of the improvement.

Figure 4 is a section view on the line 4—4 of Figure 1.

The body of the valve is made up of two sections, the upper section being indicated by the numeral 1 and the lower section by the numeral 2. The upper section 1 has screwed in its top a cage 3, provided with the usual threaded extension to which the operating rod or line is attached. It is to be noted that no valve is arranged in the cage.

The sections 1 and 2 are connected together by a sleeve 4 and screwed in the upper section 1 and received in the sleeve 4 there is a seat 5 for a ball valve 6. Above the valve seat the coupling sleeve 4 has its wall formed with a transverse partition provided with spaced apertures, as clearly disclosed in Figure 4. The partition 7 also serves to limit the unseating of the valve 6.

On the lower end of the section 4 there is screwed a cage 8, and above the cage a conical nut 9 against whose sides rest a downwardly directed cup-shaped washer 10. The upper portion of the washer is in contacting engagement with a disk 11 that contacts with a shoulder 12 on the section 2. The cage 8 does not contain a valve.

The upper section 1, at a suitable distance from its connection with the cage 3 is reduced in cross section and has arranged thereon spaced ring members 13 whose upper ends are widened as at 14 and flared inwardly. The lower ends of the ring members 13 are rounded, and received between the rings there are upwardly directed cup-shaped washers 15. The lower washer rests on the upper end of the coupling sleeve 4 and the upper ring washer has its body portion contacted by the shoulder 16 provided between the enlarged and reduced portion of the section 1. The section 1 has any number of spaced circumferentially arranged openings 17 therethrough and certain of these openings communicate with outwardly connected openings 18 in the spacer rings 13.

As disclosed by the dotted lines in Figure 1 of the drawings the well casing is indicated by the numeral 19, also as disclosed by the said figure it will be noted that both the upwardly directed series of cup-shaped washers 16 and the downwardly directed cup-shaped washer 10 are in close contact with the bore of the well casing or barrel. A downward movement of the traveling valve, constituting my improvement, will cause the fluid to unseat the valve 6 and to pass through the ports 7 of the coupling 4 into the section 1 of the improvement. Certain of this fluid will find an outlet through the ports 17 and 18 to effectively lubricate the upwardly directed cup washers 13, the remainder of the fluid passing through the slots 20 in the cage 3 and the fluid that passes below the said slots will likewise contact with the upper washer 13 of the improvement. In this manner it will be seen that the washers are continuously lubricated and likewise held in tight contacting engagement with the barrel or casing 1. On the upward stroke of the improvement the washers 13 may be slightly compressed but the lower washer 13 will be expanded so that an absolutely fluid-tight joint is provided and liability of wasting pumped fluid overcome.

The lower cup is arranged at a downward angle on the device while the upper cups are disposed in an opposite direction. The lower cup serves to prevent sand from contacting with the upper cups during the fluid lifting operation. From experience I have found that my improvement creates a greater suction than any other device for a similar purpose with which I am acquainted, and that the life of the cup washers is extended because they are sustained in spread condition as they wear. I have also found that my improvement will not cut much oil when the cups wear as the device will stop pumping entirely until recupped or repacked.

Having described the invention, I claim:—

In combination with a barrel valve having cup-shaped, upwardly directed compression washers disposed thereon; a cylindrical extension member threaded into the lower end of the body of said valve; a ball valve in said extension member; movement limiting means for said valve; a tubular member threaded into said cylindrical extension member; a cage on the opposite end of said tubular member, and an inverted cup-shaped compression washer mounted on said tubular member intermediate its ends, whereby to afford compression on the downward action of said barrel valve.

In testimony whereof I affix my signature.

LESTER DANIEL MOWREY.